(12) United States Patent
Roeder et al.

(10) Patent No.: US 10,655,780 B2
(45) Date of Patent: May 19, 2020

(54) ADAPTIVE MOUNTING BRACKET ASSEMBLY

(71) Applicant: THE BOEING COMPANY, Chicago, IL (US)

(72) Inventors: Raymond Roeder, Everett, WA (US); Alyssa L. Yap, Lynnwood, WA (US); Wade T. Price, Redmond, WA (US); Christopher L. Schwitters, Everett, WA (US); Bruce R. Olsen, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 15/835,583

(22) Filed: Dec. 8, 2017

(65) Prior Publication Data

US 2019/0178439 A1    Jun. 13, 2019

(51) Int. Cl.

| F16M 13/02 | (2006.01) |
|---|---|
| F16B 2/10 | (2006.01) |
| B64C 1/40 | (2006.01) |
| F16B 2/20 | (2006.01) |
| B64C 1/00 | (2006.01) |
| B64C 1/06 | (2006.01) |
| B64D 9/00 | (2006.01) |

(52) U.S. Cl.
CPC ............. F16M 13/022 (2013.01); B64C 1/00 (2013.01); F16B 2/10 (2013.01); *B64C 1/064* (2013.01); *B64C 1/40* (2013.01); *B64D 9/00* (2013.01)

(58) Field of Classification Search
CPC .... B64C 1/403; F16B 2/10; F16B 2/20; F16B 2/245; F16M 13/022
USPC ....................... 248/229.13, 231.51
See application file for complete search history.

(56) References Cited

U.S. PATENT DOCUMENTS

| 2016/0195118 A1* | 7/2016 | Munch-Fals | ............. | B65D 9/24 24/535 |
|---|---|---|---|---|
| 2018/0245610 A1* | 8/2018 | Hesslewood | ............. | F16B 2/22 |

\* cited by examiner

*Primary Examiner* — Philip J Bonzell
*Assistant Examiner* — Tye William Abell
(74) *Attorney, Agent, or Firm* — The Small Patent Law Group LLC; Joseph M. Butscher (57) ABSTRACT

A mounting bracket assembly is configured to securely couple to a structure. The mounting bracket assembly includes a securing cradle defining a securing chamber, a pivot arm that pivotally couples to the securing cradle through a first hinge, and a locking arm that pivotally couples to the pivot arm through a second hinge. The pivot arm and the locking arm are configured to pivotally move via the first hinge and the second hinge into an over-center securing position within the securing chamber to securely lock the mounting bracket assembly to the structure.

20 Claims, 4 Drawing Sheets

ADAPTIVE MOUNTING BRACKET ASSEMBLY

FIELD OF THE DISCLOSURE

Embodiments of the present disclosure generally relate to adaptive mounting bracket assemblies, and, more particularly, to adaptive mounting bracket assemblies that are configured to be quickly and easily secured to structures, such as within an internal cabin of a vehicle.

BACKGROUND OF THE DISCLOSURE

A vehicle, such as a commercial aircraft, includes numerous components that are secured to one another. For example, stringers or frames are secured to outer skins, and thereby form portions of a fuselage, for example. Various components may be secured to the frames. In order to secure various components to structures of an aircraft, mounting holes that are configured to receive fasteners (such as bolts, screws, and/or the like) are formed through the structures and/or the components. Typically, complex engineering analyses are used to determine precise locations for the mounting holes, fasteners, and the nature of such fasteners because holes, for example, de-rate a strength capability of the underlying structure. Further, the process of securing the components to the structures may be time and labor intensive, as individuals need to align fasteners with the mounting holes, align mounting brackets to the structures, and use one or more tools to secure the mounting brackets to the structures and/or components via the fasteners. Additionally, various locations within an aircraft may not be spacious enough to allow an individual to easily manipulate a tool and/or the mounting bracket, thereby further complicating an installation process.

Typically, a mounting bracket is secured to a structure within an aircraft through one or more fasteners. However, a known mounting bracket exists that secures over an insulation blanket within an aircraft without the use of separate and distinct fasteners. However, the known mounting bracket may exert a relatively great amount of pressure into portions of the insulation blanket during installation and/or removal, and may tear, puncture, or otherwise damage the insulation blanket.

SUMMARY OF THE DISCLOSURE

A need exists for a mounting bracket that may be quickly and easily secured to a structure, such as within an internal cabin of a vehicle. Further, a need exists for a mounting bracket that may securely and safely mount to a structure without the need for separate and distinct fasteners.

With those needs in mind, certain embodiments of the present disclosure provide a mounting bracket assembly that is configured to securely couple to a structure. The mounting bracket assembly includes a securing cradle defining a securing chamber, a pivot arm that pivotally couples to the securing cradle through a first hinge, and a locking arm that pivotally couples to the pivot arm through a second hinge. The pivot arm and the locking arm are configured to pivotally move via the first hinge and the second hinge into an over-center securing position within the securing chamber to securely lock the mounting bracket assembly to the structure. The mounting bracket assembly securely couples to the structure without the use of a separate and distinct fastener.

In at least one embodiment, the securing cradle includes a support base, a mounting plate connected to the support base, and a lip connected to the mounting plate. The securing chamber is defined between the support base, the mounting plate, and the lip. The support base may angle away from the mounting plate. The mounting plate may be perpendicularly connected to the lip. The mounting plate is configured to securely couple to a portion of a component.

In at least one embodiment, a distal end of the locking arm is configured to be lodged into a portion of the structure when the pivot arm and the locking arm are in the over-center securing position. The pivot arm may include one or more tactile grip tabs that are configured to be grasped by an individual to move the pivot arm and the locking arm into and out of the over-center securing position.

The pivot arm has a first length. The locking arm has a second length. In at least one embodiment, the second length is greater than the first length.

Certain embodiments of the present disclosure provide a method of securely coupling a mounting bracket assembly to a structure. The method includes providing a securing chamber of a securing cradle of the mounting bracket assembly, pivotally coupling a pivot arm to the securing cradle through a first hinge, pivotally coupling a locking arm to the pivot arm through a second hinge, moving the pivot arm and the locking arm via the first hinge and the second hinge into an over-center securing position within the securing chamber, and securely locking the mounting bracket assembly to the structure through the moving operation.

Certain embodiments of the present disclosure provide a vehicle, such as an aircraft, that includes an internal cabin, a stringer within the internal cabin, an insulation blanket positioned over the stringer, and a mounting bracket assembly that securely mounts to the insulation blanket and the stringer, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features.

Moreover, unless explicitly stated to the contrary, embodiments "comprising" or "having" an element or a plurality of elements having a particular condition may include additional elements not having that condition.

Certain embodiments of the present disclosure provide an adaptive mounting bracket assembly that is configured to secure onto a structure, such as within an internal cabin of an aircraft. The adaptive mounting bracket assembly is configured to securely and safely secure over an insulation blanket within an internal cabin of an aircraft to both retain the blanket to the structure and provide an interface to securely support light weight articles and/or portions of larger system elements. The mounting bracket assembly may be secured to a structure without the use of separate and distinct fasteners, or even tools. Indeed, an individual may securely couple the mounting bracket to a structure simply with the use of a single hand.

In at least one embodiment, a secure clamping exerted by the mounting bracket assembly is achieved through a binding force of an over-center position and the spring-like flexibility of the mounting bracket assembly. For example, the mounting bracket assembly may be formed of a resilient, spring-like material (such as a plastic) that allows arms of the mounting bracket assembly to move past an over-center position.

In at least one embodiment, a locking pawl may be used to securely hold a pivot arm, and/or prevent the pivot arm from reversing rotation. Further, a distal end of the locking arm and the structure may include an elastomeric (such as rubber) boots or other such coverings. The boots are configured to contact a structure onto which the mounting bracket assembly is secured.

Certain embodiments of the present disclosure are configured to mount other devices to the mounting bracket assembly. For example, the mounting bracket assembly may include a flat surface onto which a device may adhere, and/or or integration of threaded inserts to allow a variety of devices, adapters, and/or the like to couple thereto. Optionally, the mounting bracket assembly may include custom interface features, which allow for snap, turn-and-click, or other such securing features.

Figure 1:
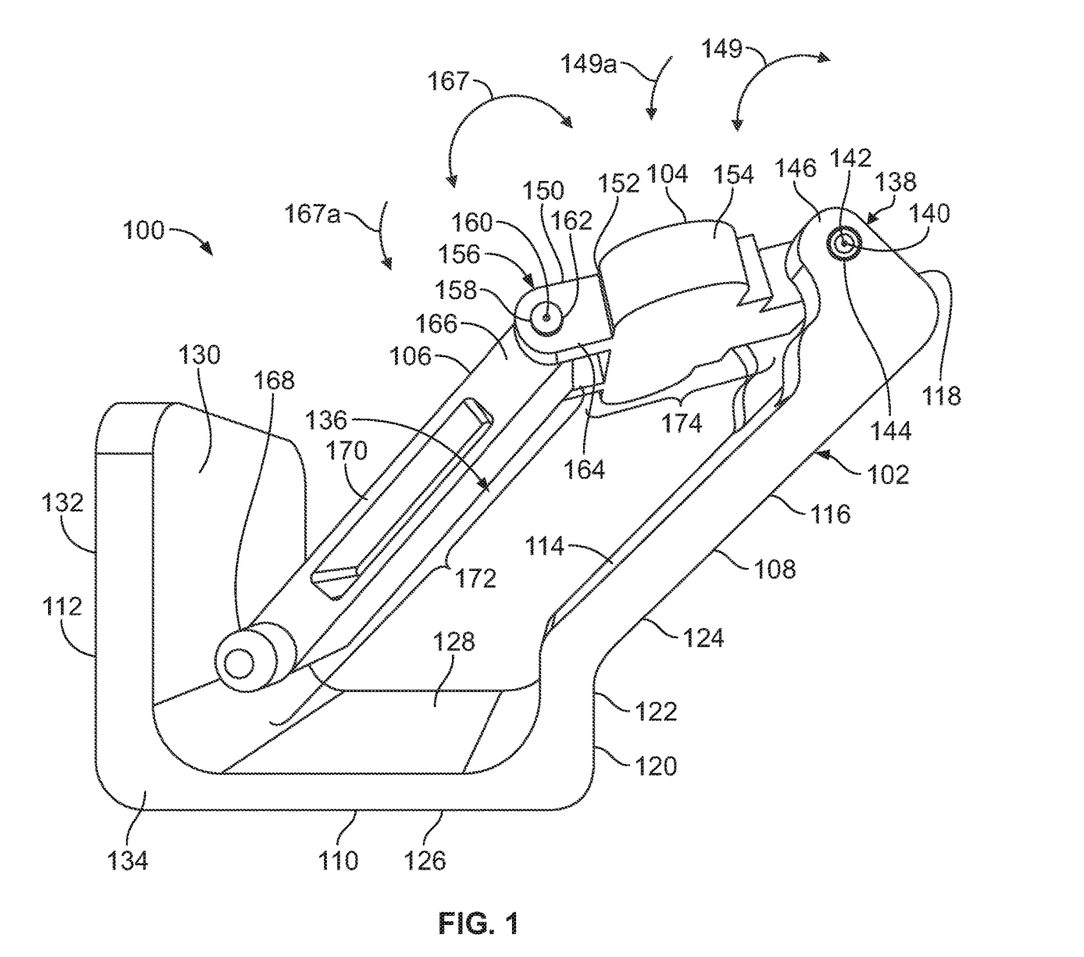
FIG. 1 illustrates a lateral view of a mounting bracket assembly, according to an embodiment of the present disclosure.
Figure 2:
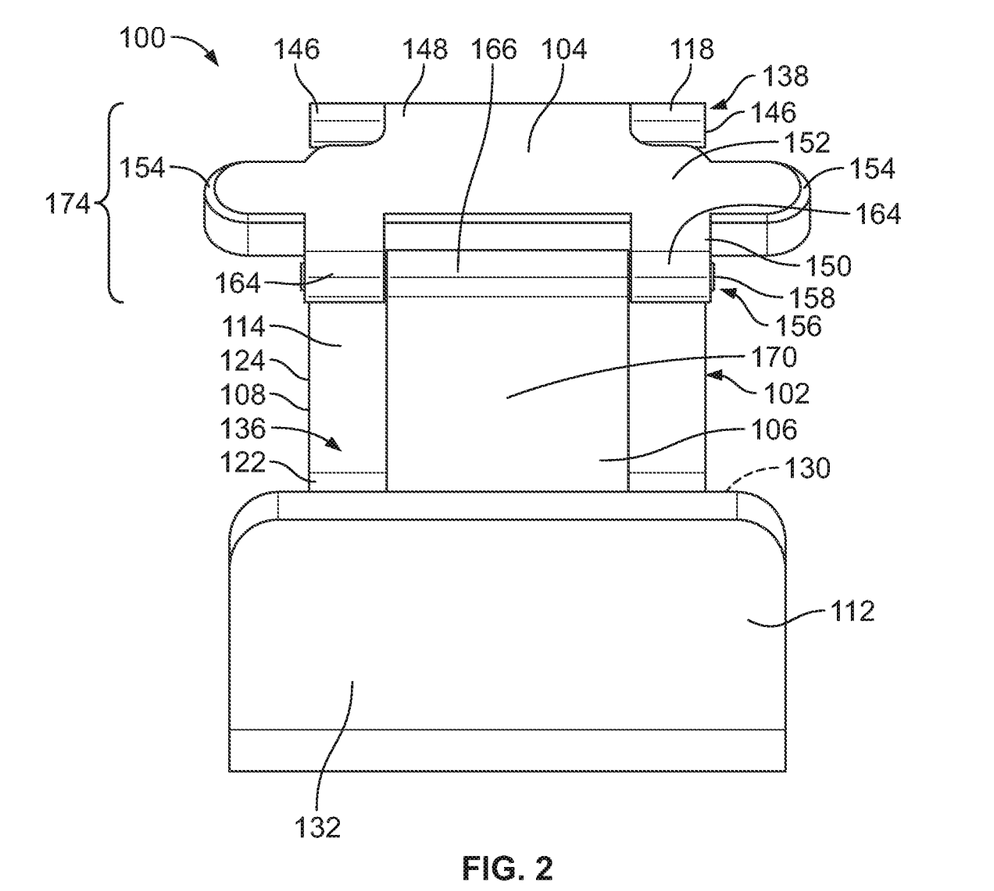
FIG. 2 illustrates a perspective front view of a mounting bracket assembly, according to an embodiment of the present disclosure.

FIG. 1 illustrates a lateral view of a mounting bracket assembly 100, according to an embodiment of the present disclosure. FIG. 2 illustrates a perspective front view of the mounting bracket assembly 100. Referring to FIGS. 1 and 2, the mounting bracket assembly 100 includes a securing cradle 102, a pivot arm 104 pivotally coupled to the securing cradle 102, and a locking arm 106 pivotally coupled to the pivot arm 104.

The securing cradle 102 includes a support base 108, a mounting plate 110, and a lip 112. The support base 108, the mounting plate 110, and the lip 112 may be fixed in position relative to one another. The support base 108 includes an inner surface 114 connected to an opposite outer surface 116. The inner surface 114 and the outer surface 116 may be planar surfaces. A first end 118 of the support base 108 connects to the pivot arm 104. A second end 120 of the support base 108 that is opposite from the first end 118 connects to the mounting plate 110. As shown, the support base 108 may outwardly and upwardly (as shown in the orientation of FIGS. 1 and 2) angle away from the mounting plate 110. The second end 120 may include a wall 122 that connects to the mounting plate 110 at a right angle. That is, the wall 122 may be generally perpendicular to the mounting plate 110. The wall 122 may connect to an angled wall 124 that outwardly and upwardly angles away from the wall 122. Optionally, the support base 108 may be angled differently with respect to the mounting plate 110 than shown. For example, the support base 108 may include a single flat wall that connects to the mounting plate 110 at a right angle, rather than having the angled wall 124. That is, in at least one embodiment, the angled wall 124 may instead be a wall that is coplanar with the wall 122.

The mounting plate 110 includes an outer surface 126 that connects to an opposite inner surface 128. The mounting plate 110 may be a flat, linear wall that spans between the second end 120 of the support base 108, and the lip 112. Interior surfaces of the support base 108, the mounting plate 110, and the lip 112 at or otherwise proximate to connection joints therebetween may be curved, as shown. Optionally, the interior surfaces proximate to the joints may be not be curved, but instead be linear right angled joints.

The lip 112 includes an outer surface 130 that connects to an opposite inner surface 132. The lip 112 may be a planar panel that upwardly extends from an end 134 of the mounting plate 110 that is distally located from the support base 108. As shown, the lip 112 may be perpendicular to the mounting plate 110.

The inner surfaces 114, 128, and 130 of the respective support base 108, the mounting plate 110, and the lip 112 define a securing chamber 136. That is, the securing chamber 136 is defined between the support base 108, the mounting plate 110, and the lip 112. The mounting bracket assembly 100 is configured to securely retain a portion of a structure within the securing chamber 136.

The pivot arm 104 pivotally couples to the end 118 of the support base 108. A first hinge 138 pivotally couples the pivot arm 104 to the support base 108. The first hinge 138 includes a pivot axle 140 defining a pivot axis 142 of the pivot arm 104. The pivot axle 140 is rotatably secured within reciprocal channels 144 formed through opposed coupling prongs 146 of the support base 108. Optionally, the first hinge 138 may include a pivot axle of the support base 108, and reciprocal channels of the pivot arm 104. That is, the pivot axle 140 may be part of the support base 108, while the pivot arm 104 includes the reciprocal channels that rotatably retain ends of the pivot axle 140.

The pivot axle 140 laterally extends from the pivot arm 104 at a first end 148. The first hinge 138 is configured to allow the pivot arm 104 to pivot about the pivot axis 142 relative to the support base 108 in the directions of arc 149.

The first end 148 of the pivot arm 104 connects to a second end 150 of the pivot arm 104 through a main body 152. Tactile grip tabs 154 extend from the sides of the main body 152 of the pivot arm 104. The grip tabs 154 are configured to be grasped by fingers of an individual.

The pivot arm 104 also pivotally couples to the locking arm 106 through a second hinge 156. The second hinge 156 includes a pivot axle 158 defining a pivot axis 160 of the locking arm 106. The pivot axle 158 is rotatably secured within reciprocal channels 162 formed through opposed coupling prongs 164 of the second end 150 of the pivot arm 104. Optionally, the second hinge 156 may include a pivot axle of the pivot arm 104, and reciprocal channels of the locking arm 106. That is, the pivot axle 158 may be part of the support base pivot arm 104, while the locking arm 106 includes the reciprocal channels that rotatably retain ends of the pivot axle 158.

The pivot axle 158 laterally extends from the locking arm 106 a first end 166. The second hinge 156 is configured to allow the pivot arm 104 and the locking arm 106 to pivot about the pivot axis 160 relative to one another in the directions of arc 167.

In at least one embodiment, the pivot axles 140 and 158 may be integrally molded and formed with portions of the mounting bracket assembly 100, instead of separate and distinct pins. For example, the pivot axles 140 and 158 may be plastic structures that are integrally formed with the pivot arm 104, the locking arm 106, and/or the support base 108.

In at least one embodiment, the mounting bracket assembly 100, including the pivot axles 140 and 158, is formed of a resilient material that is configured to flex. For example, the mounting bracket assembly 100 may be formed of a resilient plastic that is able to flex.

The first end 166 of the locking arm 106 connects to a distal second end 168 through an extension beam 170. The second end 168 may abut into the inner surface 130 of the lip 112.

As shown, the locking arm 106 may be a linear beam. The locking arm 106 has a length 172 that is greater than a length 174 of the pivot arm 104. For example, the length 172 of the locking arm 106 may be twice or more than the length 174 of the pivot arm 104. The pivot arm 104 is shorter than the locking arm 106 in order to provide ease of rotation of the pivot arm 104 and the locking arm 106 towards and into an over-center securing position.

In operation, the mounting bracket assembly 100 is configured to fit over or otherwise onto a structure. For example, a portion of a structure is positioned within the securing chamber 136. In order to securely clamp the mounting bracket assembly 100 to the structure, an individual grasps the pivot arm 104, such as via the grip tabs 154, and pivots the pivot arm 104 about the first hinge 138 towards the inner surface 114 of the support base 108 in the direction of arc 149a. As the pivot arm 104 pivots towards the inner surface 114, the locking arm 106 pivots in relation to the pivot arm 104 about the second hinge 156 in the direction of arc 167a, thereby urging the distal second end 168 towards the lip 112 so as to slide the second end 168 over a portion of the structure positioned between the lip 112 and the second end 168 of the locking arm 106. Because the distal second end 168 of the locking arm 106 is urged into the structure, the securing cradle 102 flexes in response to allow the pivot arm 104 and the locking arm 106 move into a linearly-aligned orientation, such that central longitudinal planes of the pivot arm 104 and the locking arm 106 are coplanar. With continued urging of the pivot arm 104 in the direction of arc 149a, the pivot arm 104 and the locking arm 106 move out of linear alignment into an over-center securing position, in which the locking arm 106 securely lodges into the structure, such that the structure is compressively sandwiched between the lip 112 and the distal end 168 of the locking arm 106. As such, the mounting bracket assembly 100 securely locks onto the structure. In particular, the pivot arm 104 and the locking arm 106 provide an over-center linkage that securely locks the mounting bracket assembly 100 to the structure. The over-center position is maintained so long as no rotation force in the reverse direction of arc 149a drives past the resisting securing cradle 102. The over-center linkage provides a mechanical stop and prevents back-driving of the pivot arm 104 and the locking arm 106 towards a linear alignment. The pivot arm 104 and the locking arm 106 are rotated into an over-center securing position to securely lock the mounting bracket assembly 100 to a structure.

In at least one embodiment, a retainer such as a detent, pawl, latch, barb, clasps, and/or the like may be used to positively retain the pivot arm 104 in the over-center position. For example, the securing cradle 102 may include the retainer that securely retains a portion of the pivot arm 104 in the over-center position.

In order to remove the mounting bracket assembly 100 from the structure, an individual grasps the locking arm 106 (such as by the grip tabs 154) and pushes the pivot arm in a direction opposite from arc 149a, so that the pivot arm 104 pivots away from the inner surface 114 of the support base 108. As such, the pivot arm 104 and the locking arm 106 pivot out of the over-center securing position, back towards and out of linear alignment, which unlocks the mounting bracket assembly 100 from the structure, thereby allowing an individual to remove the mounting bracket assembly 100 from the structure.

If the mounting bracket assembly 100 includes a retainer, the pivot arm 104 may first be released from the retainer. The mounting bracket assembly 100 may then be removed from the structure, as described herein.

The mounting bracket assembly 100 may be formed of plastic. For example, the mounting bracket assembly 100 may be formed of printable, aerospace standard plastic, which has been found to provide a spring-like response, thereby allowing link movement and rotation to compensate for different thicknesses of different structures. The pivot arm 104 and the locking arm 106 allow the mounting bracket assembly 100 to fit to various structures having different sizes and shapes. As such, the mounting bracket assembly 100 may adapt to a size and shape of various structures. Further, as described, the mounting bracket assembly 100 may be secured to a structure without the use of separate and distinct fasteners, or a tool. Instead, an individual may securely couple and uncouple the mounting bracket assembly 100 to a structure with one hand, for example.

The mounting bracket assembly 100 is configured to securely couple to a structure. As described, the mounting bracket assembly 100 includes the securing cradle 102 defining the securing chamber 136. The pivot arm 104 pivotally couples to the securing cradle 102 through the first hinge 138. The locking arm 106 pivotally couples to the pivot arm 104 through the second hinge 156. The pivot arm 104 and the locking arm 106 are configured to pivotally through the first hinge 138 and the second hinge 156 into an over-center securing position within the securing chamber 136 to securely lock the mounting bracket assembly 100 to the structure.

Figure 3:
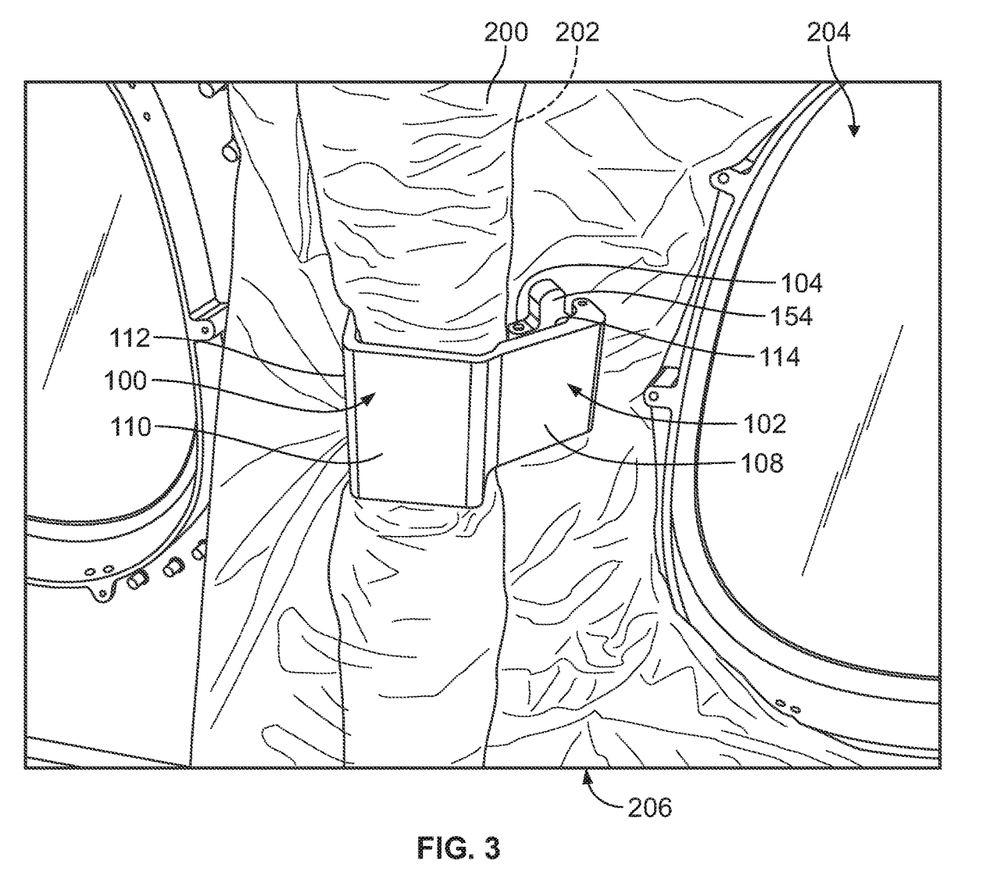
FIG. 3 illustrates a perspective view of a mounting bracket assembly secured over an insulation blanket positioned over a stringer within an internal cabin of an aircraft, according to an embodiment of the present disclosure.

FIG. 3 illustrates a perspective view of the mounting bracket assembly 100 secured over an insulation blanket 200 positioned over a stringer 202 within an internal cabin 204 of an aircraft 206, according to an embodiment of the present disclosure. Referring to FIGS. 1-3, the securing cradle 102 fits over the insulation blanket 200 and a portion of the stringer 202, such that the insulation blanket 200 and the portion of the stringer 202 are retained within the securing chamber 136. As shown in FIG. 3, the locking arm 106 is inwardly pivoted toward the inner surface 114 of the support base 108, thereby moving the pivot arm 104 and the locking arm 106 into an over-center securing position, which securely clamps the mounting bracket assembly 100 over the insulation blanket 200 and the portion of the stringer 202.

The mounting plate 110 is configured to receive and retain a portion of a component such that the component may be securely coupled to the mounting plate 110. In at least one embodiment, the mounting plate 110 provides a flat bearing surface onto which adhesive may be applied to secure the component to the mounting plate 110. In at least one other embodiment, the mounting plate 110 may include latches, barbs, clasps, or the like that are configured to securely connect to a portion of the component. In at least one other embodiment, the mounting plate 110 may include one or more securing protuberances, such as threaded studs, posts, nubs, and/or the like that are configured to couple to reciprocal structures of the component. In at least one other embodiment, the mounting plate 110 may include one or more threaded through-holes, cavities, channels, and/or the like that are configured to securely retain reciprocal structures of the component.

Figure 4:
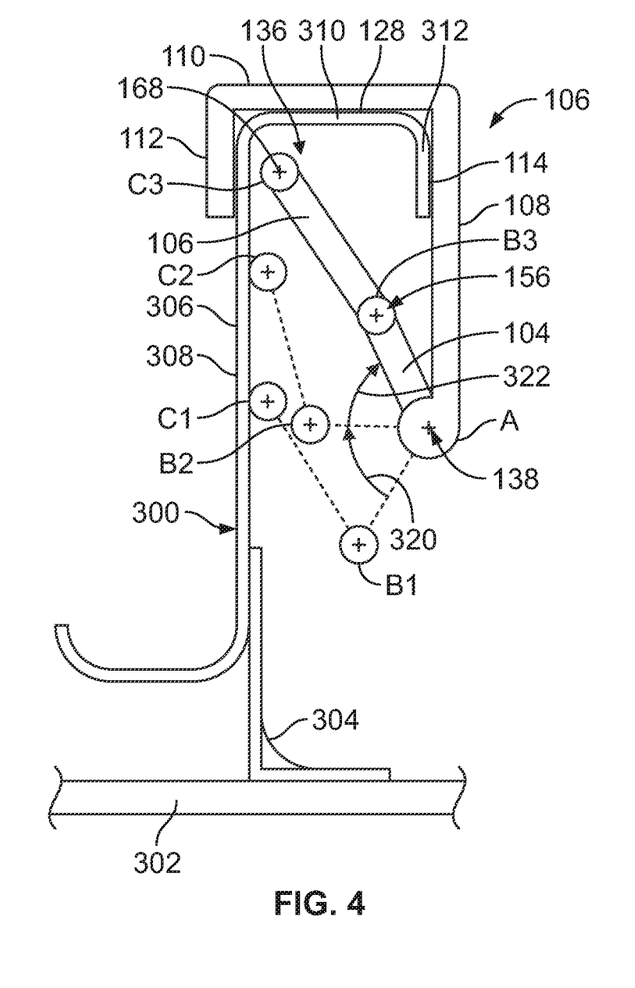
FIG. 4 illustrates a lateral view of a mounting bracket assembly secured to a structure, according to an embodiment of the present disclosure.

FIG. 4 illustrates a lateral view of the mounting bracket assembly 100 secured to a structure 300, according to an embodiment of the present disclosure. The structure 300 may be a stringer or frame that secures to a skin 302 (such as of a fuselage of an aircraft) through a shear tie 304. The structure 300 may include a frame 306 having an extension beam 308 that connects to a perpendicular cross beam 310, which, in turn, connects to a foot 312, which may be parallel to the extension beam 308. The frame 306 may be formed having an S- or Z-shaped cross section, as shown in FIG. 4. Optionally, the frame 306 may be have an L-shaped cross-section, an I-shaped cross-section, or various other shapes and sizes not shown. Further, the structure 300 may secure to the skin 302 by itself, or through the shear tie 304, as shown.

In order to secure the mounting bracket assembly 100 to the structure 300, an individual first positions the securing cradle 102 onto the structure, such that the foot 312 rests against the inner surface 114 of the support base 108, the cross beam 310 rests against the inner surface 128 of the mounting plate 110, and a portion of the extension beam 308 rests against the inner surface 130 of the lip 112. Optionally, the foot 312 may be spaced apart from the inner surface 114, and/or the portion of the extension beam 308 may be spaced apart from the lip 112.

As the mounting bracket assembly 100 is initially connected to the structure 300, the pivot arm 104 and the locking arm 106 are in a position denoted by A-B1-C1, in which the second hinge 156 is outside of the securing chamber 136 (as denoted by location B1). In this position, the distal second end 168 of the locking arm 106 abuts against the extension beam 308 at the position denoted C1. To securely clamp the mounting bracket assembly 100 to the structure 300, an individual pushes the pivot arm 104 towards the inner surface 114 in the direction of arc 320. During such motion, the distal second end 168 of the locking arm 106 slides over the inner surface of the extension beam 308 towards the cross beam 310 such that the pivot arm 104 may be parallel with the mounting plate 110 and the pivot arm 104 and the locking arm 106 are denoted by a position A-B2-C2. With continued urging of the pivot arm 104 in the direction of arc 322, the pivot arm 104 and the locking arm 106 linearly align as the securing cradle 102 flexes in a spring-like manner. With further urging of the pivot arm 104 in the direction of arc 322 towards the inner surface 114 of the support base 108, the pivot arm 104 and the locking arm 104 move into the over-center securing position denoted by A-B3-C3, in which the distal second end 168 is firmly lodged into the inner surfaces of the extension beam 308 (and optionally the cross beam 310), while at least a portion of the pivot arm 104 may abut into the inner surface 114 of the support base 108. The over-center position is held in place by the resistive spring-like flex force of the securing cradle 102. In this manner, the mounting bracket assembly 100 securely locks onto the structure 300. In at least one embodiment, the support base 108 may include a retaining structure (such as a channel, clasp, latch, or the like) that securely retains a portion of the pivot arm 104 in the over-center securing position.

Figure 5:
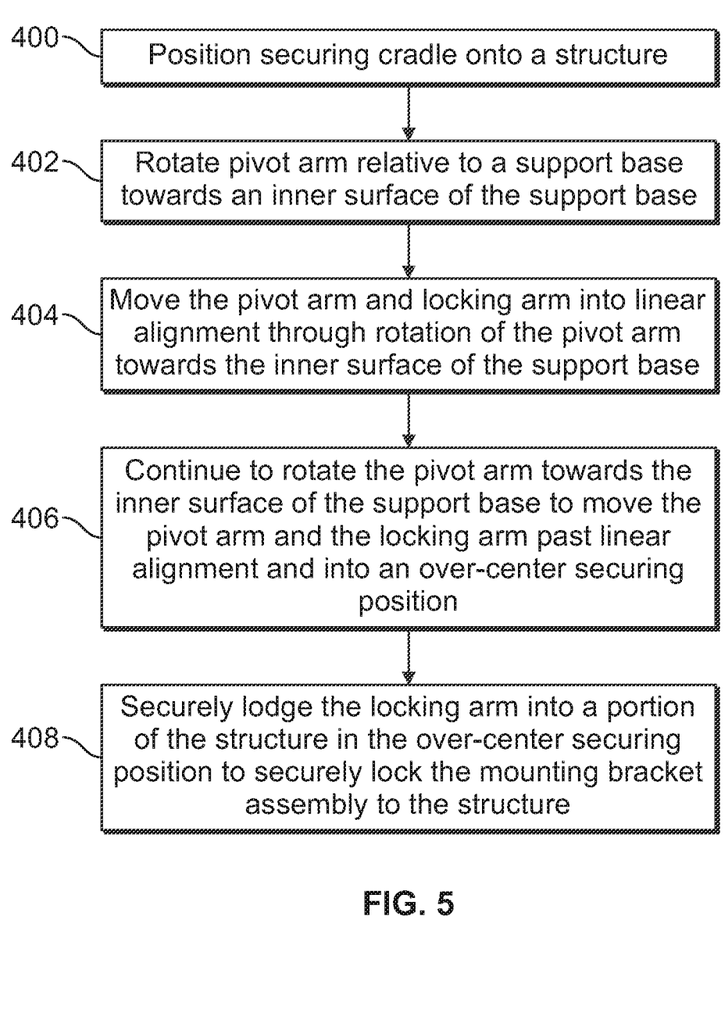
FIG. 5 illustrates a flow chart of a method of securing a mounting bracket assembly onto a structure, according to an embodiment of the present disclosure.

FIG. 5 illustrates a flow chart of a method of securing a mounting bracket assembly 100 onto a structure, according to an embodiment of the present disclosure. Referring to FIGS. 1-5, the method begins at 400, at which the securing cradle 102 is positioned on a structure (such as the insulation 200 that covers the stringer 202 shown in FIG. 3). At 402, the pivot arm 104 is then rotated relative to the support base 108 towards the inner surface 114 of the support base 108. At 404, the pivot arm 104 and the locking arm 106 are moved into linear alignment through rotation of the pivot arm 104 towards the inner surface 114 of the support base 108. At 406, the pivot arm 104 continues to be rotated towards the inner surface 114 of the support base 108 to move the pivot arm 104 and the locking arm 106 past linear alignment, and into the over-center securing position. At 408, the locking arm 106 is securely lodged into a portion of the structure in the over-center securing position, thereby securely locking the mounting bracket assembly 100 to the structure.

As described herein, embodiments of the present disclosure provide mounting bracket assemblies that are configured to be quickly and easily secured to a structure, such as within an internal cabin of a vehicle. Further, embodiments of the present disclosure provide mounting bracket assemblies that are configured to be securely and safely mounted to a structure without the need for separate and distinct fasteners or tools.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §

112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A mounting bracket assembly that is configured to securely couple to a structure, the mounting bracket assembly comprising:
    a securing cradle defining a securing chamber;
    a pivot arm that pivotally couples to the securing cradle through a first hinge; and
    a locking arm that pivotally couples to the pivot arm through a second hinge, wherein the pivot arm and the locking arm are configured to pivotally move via the first hinge and the second hinge into an over-center securing position within the securing chamber to securely lock the mounting bracket assembly to the structure.

2. The mounting bracket assembly of claim 1, wherein a distal end of the locking arm is configured to be lodged into a portion of the structure when the pivot arm and the locking arm are in the over-center securing position.

3. The mounting bracket assembly of claim 1, wherein the pivot arm comprises one or more tactile grip tabs that are configured to be grasped by an individual to move the pivot arm and the locking arm into and out of the over-center securing position.

4. The mounting bracket assembly of claim 1, wherein the pivot arm has a first length, wherein the locking arm has a second length, and wherein the second length is greater than the first length.

5. The mounting bracket assembly of claim 1, wherein the mounting bracket assembly securely couples to the structure without the use of a separate and distinct fastener.

6. The mounting bracket assembly of claim 1, wherein the securing cradle comprises:
    a support base;
    a mounting plate connected to the support base; and
    a lip connected to the mounting plate, wherein the securing chamber is defined between the support base, the mounting plate, and the lip.

7. The mounting bracket assembly of claim 6, wherein the support base angles away from the mounting plate.

8. The mounting bracket assembly of claim 6, wherein the mounting plate is perpendicularly connected to the lip.

9. The mounting bracket assembly of claim 6, wherein the mounting plate is configured to securely couple to a portion of a component.

10. A method of securely coupling a mounting bracket assembly to a structure, the method comprising:
    providing a securing chamber of a securing cradle of the mounting bracket assembly;
    pivotally coupling a pivot arm to the securing cradle through a first hinge;
    pivotally coupling a locking arm to the pivot arm through a second hinge;
    moving the pivot arm and the locking arm via the first hinge and the second hinge into an over-center securing position within the securing chamber; and
    securely locking the mounting bracket assembly to the structure through the moving operation.

11. The method of claim 10, wherein the moving operation comprises lodging a distal end of the locking arm into a portion of the structure when the pivot arm and the locking arm are in the over-center securing position.

12. The method of claim 10, further comprising grasping one or more tactile grip tabs of the pivot arm to move the pivot arm and the locking arm into and out of the over-center securing position.

13. The method of claim 10, wherein the pivot arm has a first length, wherein the locking arm has a second length, and wherein the second length is greater than the first length.

14. The method of claim 10, wherein the securely locking operation comprises securely coupling the mounting bracket assembly to the structure without the use of a separate and distinct fastener.

15. The method of claim 10, further comprising forming the securing cradle to include a support base, a mounting plate connected to the support base, and a lip connected to the mounting plate, wherein the securing chamber is defined between the support base, the mounting plate, and the lip.

16. The method of claim 15, wherein the forming operation comprises angling the support base away from the mounting plate.

17. The method of claim 15, wherein the forming operation comprises perpendicularly connecting the mounting plate to the lip.

18. The method of claim 15 further comprising configuring the mounting plate to securely couple to a portion of a component.

19. An aircraft comprising:
    an internal cabin;
    a stringer within the internal cabin;
    an insulation blanket positioned over the stringer; and
    a mounting bracket assembly that securely mounts to the insulation blanket and the stringer, wherein the mounting bracket assembly comprises:
        a securing cradle defining a securing chamber;
        a pivot arm that pivotally couples to the securing cradle through a first hinge, wherein the pivot arm has a first length, wherein the pivot arm comprises one or more tactile grip tabs that are configured to be grasped by an individual; and
        a locking arm that pivotally couples to the pivot arm through a second hinge, wherein the locking arm has a second length, wherein the second length is greater than the first length, wherein the pivot arm and the locking arm are configured to pivotally move via the first hinge and the second hinge into an over-center securing position within the securing chamber to securely lock the mounting bracket assembly to the insulation blanket and the stringer, and wherein a distal end of the locking arm is configured to be lodged into the insulation blanket and the stringer when the pivot arm and the locking arm are in the over-center securing position.

20. The aircraft of claim 19, wherein the securing cradle comprises:
    a support base;
    a mounting plate connected to the support base, wherein the support base angles away from the mounting plate, wherein the mounting plate is configured to securely couple to a portion of a component; and a lip connected to the mounting plate, wherein the mounting plate is perpendicularly connected to the lip, wherein the securing chamber is defined between the support base, the mounting plate, and the lip.

\* \* \* \* \*